United States Patent
Taniguchi et al.

[11] Patent Number: 5,852,287
[45] Date of Patent: Dec. 22, 1998

[54] SEMICONDUCTOR OPTICAL DEVICE FOR CODE READER

[75] Inventors: Tadashi Taniguchi; Chiaki Kojima, both of Tokyo, Japan

[73] Assignee: Sony Corporation, Japan

[21] Appl. No.: 851,556

[22] Filed: May 5, 1997

Related U.S. Application Data

[63] Continuation of Ser. No. 416,733, May 25, 1995, Pat. No. 5,708,174, which is a continuation of PCT/JP94/01338 Aug. 12, 1994 WO95/05641 Feb. 23, 1995.

[30] Foreign Application Priority Data

Aug. 17, 1993 [JP] Japan ................................. 5-223859

[51] Int. Cl.$^6$ ........................................................... G06K 7/10
[52] U.S. Cl. ........................... 235/462; 235/454; 235/467
[58] Field of Search ......................................... 235/454, 457, 235/462, 467, 472; 359/213, 214, 215, 205

[56] References Cited

U.S. PATENT DOCUMENTS

| 4,333,006 | 6/1982 | Gorin | 235/457 |
|---|---|---|---|
| 4,733,067 | 3/1988 | Oinoue | 250/216 |
| 4,851,696 | 7/1989 | West | 250/216 X |
| 4,873,429 | 10/1989 | Kume et al. | 250/216 |
| 5,122,644 | 6/1992 | Hasegawa | 235/462 |
| 5,187,353 | 2/1993 | Metlitsky | 235/462 |
| 5,359,184 | 10/1994 | Froehlich | 235/454 |

FOREIGN PATENT DOCUMENTS 583487  4/1993  Japan .

Primary Examiner—Donald T. Hajec
Assistant Examiner—Karl Frech
Attorney, Agent, or Firm—Ronald P. Kananen

[57] ABSTRACT

To reduce the size, the weight, and the production cost and to improve the reliability of an optical device for a code reader for reading a code (24) imprinted on the package of an article, a light emitting element (21), a prism (22) and a light receiving element (15) are all fixed to a semiconductor substrate (14), so that the assembly at the semiconductor chip level of these elements (15, 21 and 22) is possible. This device can be used for an optical apparatus for reading various codes used in POS systems, physical distribution/management systems, production control systems, and so forth.

11 Claims, 4 Drawing Sheets

SEMICONDUCTOR OPTICAL DEVICE FOR CODE READER

This application is a continuation of application Ser. No. 08/416,733 filed May 25, 1995 now U.S. Pat. No. 5,708,174 which is a continuation of PCT/JP94/01338 Aug. 12, 1994 WO95/05641 Feb. 23, 1995.

TECHNICAL FIELD

The invention of the present application relates to an optical device for a code reader for reading a code such as bar code or the like imprinted on the package or the like of an article.

BACKGROUND ART

FIG. 6 shows a prior art of an optical device for a bar code reader as one of the examples of an optical device for a code reader (see, e.g., the Japanese Patent Laid Open Publication No. 276877/1992). In this prior art, laser light emitted from a laser diode 31 is first converged by a collimator lens 32, thereafter reshaped by a slit 33 and thus made a laser beam 34 having an elliptic or flat oval cross section.

The laser beam 34 is reflected by both a rotating polygon mirror 35 and a group of reflecting mirrors 36, becomes incident on a bar code 37 to be read and scans over that bar code 37. The laser light reflected by the bar code 37 is converged by a condenser lens 38 and becomes incident on a photodiode 39. The bar code 37 is read by way of a conversion of the received light signal to an electric signal and a subsequent output by the photodiode 39.

In the prior art explained above so far, as is apparent from FIG. 6, discrete parts such as the laser diode 31 as a light emitting element, the photodiode 39 as a light receiving element, and the like are assembled and fixed by adhesion or the like.

As, however, a conventional optical device for a bar code reader, with assembled discrete parts, required spaces for combining parts with inherent size, there was a limitation in reducing its size and weight. In addition, such a device also required a high precision adjustment in the order of about 10 μm of the relative position between the discrete parts, and this adjustment was not easy so that the production cost got high. Furthermore, after the assembly had been completed, there was a possibility of alteration with age of the relative position between the discrete parts, and this gave a limitation to the reliability.

DISCLOSURE OF INVENTION

The invention of the present application is achieved in view of the circumstances explained above and has objects of reducing the size, the weight and the production cost and improving the reliability of an optical device for a code reader.

In the optical device for a code reader according to the invention of the present application, a light emitting element, a prism and a light receiving element are all fixed to a semiconductor substrate, so that an assembly at the semiconductor chip level of these elements is possible. As a result of this, reduction of both the size and the weight is now possible; the production cost is kept low since, by using the high-precision packaging technology for a semiconductor device, an adjustment of the relative position between the each element is easily feasible. Moreover, the reliability is made higher since the alteration with age of the relative position and the like are excluded as sealing those elements in one package altogether is now possible.

The numerical aperture of the light converging element is larger than that of a reflecting film which reflects the light for irradiating the code, so that, even if the irradiated light on the code is scattered, this scattered light can effectively be converged. As a result of this, even if the surface of the portion on which the code is imprinted is not flat and smooth, the code can be read with high probability and a high reliability is obtained.

If an off-axis element is provided, freedom of positioning the light receiving element gets larger. Moreover, there can be prevented the light, once reflected by the code and converged by the light receiving element, from returning to the light emitting element after incidence on the reflecting film. As a result of this, even a semiconductor laser or the like can as the light emitting element let the light stably irradiate the code so that the code can be read with high probability and a high reliability is obtained.

If a light absorbing film is provided on the prism, there can be prevented the light, once emitted from the light emitting element with a wider angle than the numerical aperture of the reflecting film, from incidence as stray light on the light receiving element, so that the code can be read with higher S/N. As a result of this, the code can be read with high probability and a high reliability is obtained.

BEST MODE FOR CARRYING OUT THE INVENTION

Figure 1:
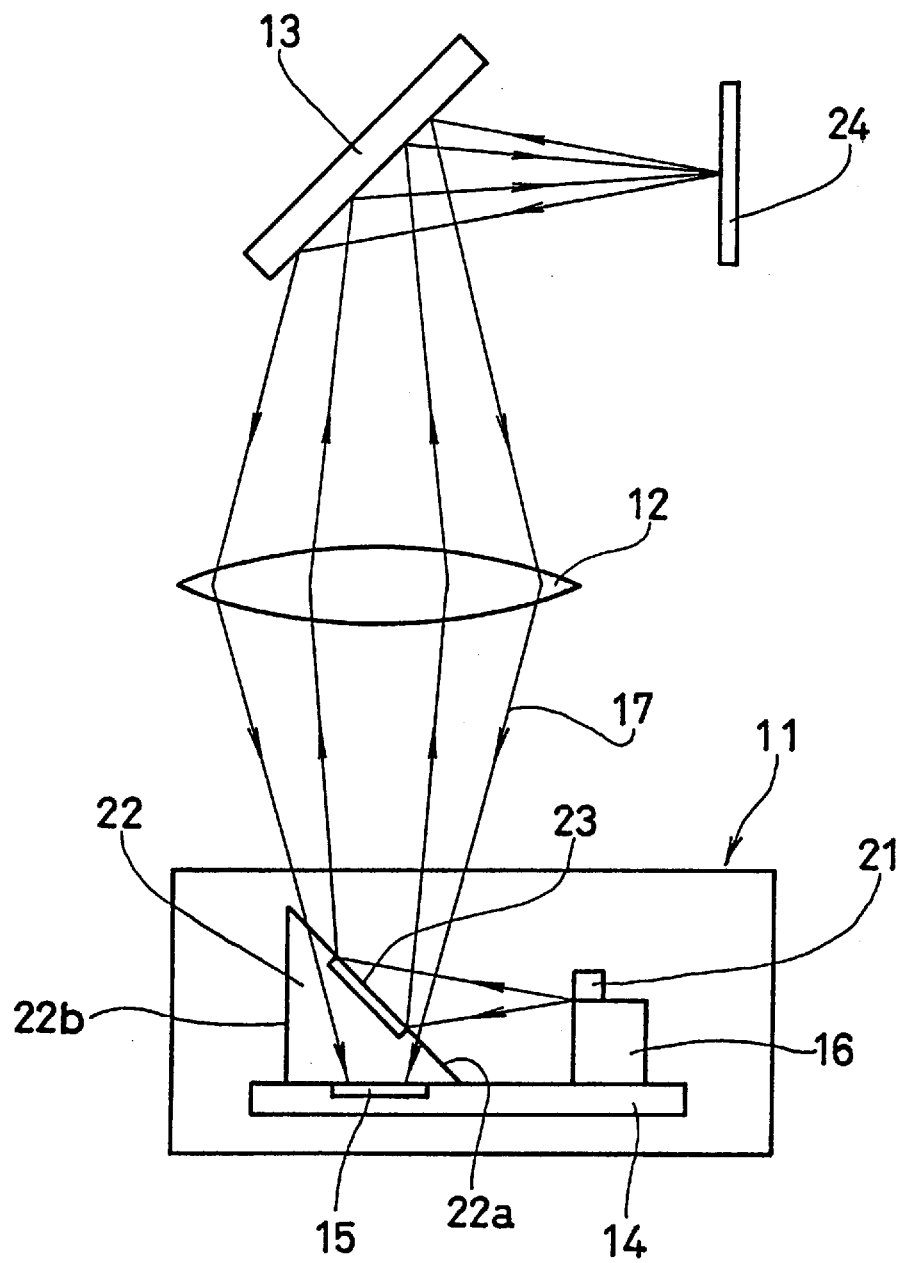
FIG. 1 shows a side view of the first embodiment according to the invention of the present application.

The first to fifth embodiments according to the invention of the present application applied to an optical device for a bar code reader will be described hereinafter referring to FIGS. 1 to 5. FIG. 1 shows the first embodiment. The first embodiment comprises a complex optical element 11 for a bar code reader, a light converging lens 12 and a swingable mirror 13.

The complex optical element 11 for a bar code reader includes a semiconductor chip 14 such as a silicon chip or the like; a photodiode 15 is formed in a region of a surface of this semiconductor chip 14. On another region on the semiconductor chip 14 than the region where the photodiode 15 is formed, there is fixed a submount 16 for adjustment of height; a laser diode 21 emitting a laser light 17 is fixed on the submount 16.

On the photodiode 15, there is fixed a prism 22 having a right-angled triangle shaped cross section and an inclined surface 22a orientated toward the laser diode 21. On one region of the inclined surface 22a, there is provided a reflecting film 23 which works as either a mirror or a half mirror for the laser light 17; the laser light 17 incident on the rest of the inclined surface 22a is all transmitted.

The reflecting film 23 is shaped such that it constitutes an aperture when looked from the laser diode 21 toward the prism 22; if the aperture is, e.g., circular, the reflecting film 23 looks circular when the prism 22 is looked from the laser diode 21. On the other hand, the lens 12 has a larger numerical aperture than the aperture formed by the reflecting film 23.

In the first embodiment having the constitution as described above so far, the laser light 17 emitted from the laser diode 21 is reflected upward by the reflecting film 23, converged by the lens 12, reflected further by the mirror 13, and focused on the bar code 24 to be read. At this time, the mirror 13 is swung, and the laser light 17 scans over the bar code 24.

The laser light 17 reflected by the bar code 24 is reflected by the mirror 13, converged by the lens 12, and becomes incident on the inclined surface 22a. The laser light 17 incident on other regions than the region of the reflecting film 23 in the inclined surface 22a transmits through this inclined surface 22a and becomes incident on the photodiode 15.

The laser light 17 incident on the region of the reflecting film 23 in the inclined surface 22a is, if the reflecting film 23 is a mirror, reflected toward the laser diode 21; if the reflecting film 23 is a half mirror, a part of the laser light 17 becomes incident on the photodiode 15 while the rest is reflected toward the laser diode 21.

In this case, the amount of the laser light 17 incident on the photodiode 15 varies depending on the reflectance of the bar code 24 so that the bar code 24 can be recognized by way of that signal. Question as to whether a mirror or a half mirror should be adopted as the reflecting film 23, or, if a half mirror is adopted, how large its reflectance should be, is to be answered by considering the magnitude of scattering of the laser light 17 by the bar code 24; the reflectance of the reflecting film 23 should be made larger with increasing magnitude of the scattering.

In the first embodiment, only the photodiode 15 is formed on the semiconductor chip 14. In addition to the photodiode 15, however, a voltage converter of signal current, an AD converter for conversion of analog signals to digital signals, and the like can also be formed there.

Figure 2:
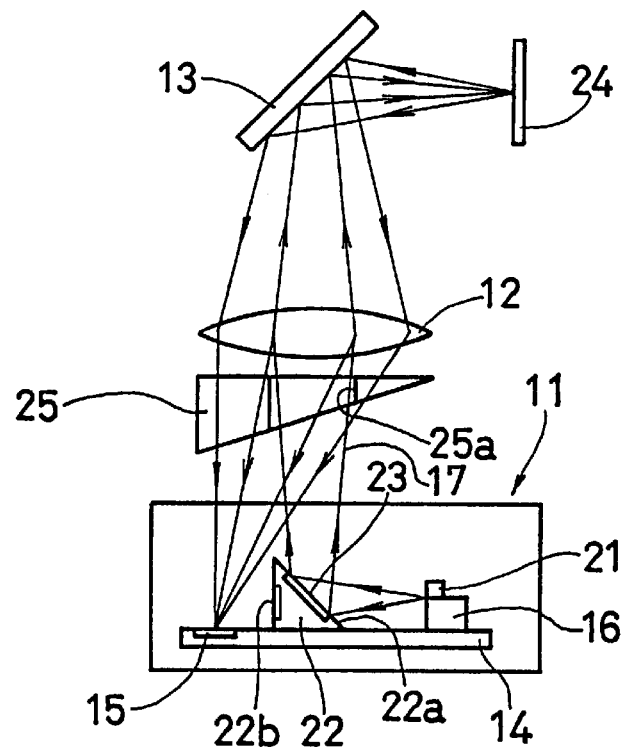
FIG. 2 shows a side view of the second embodiment according to the invention of the present application.

FIG. 2 shows the second embodiment. While the first embodiment as explained above is of an in-line type where the optical axis of the laser light 17 reflected by the bar code 24 and incident on the lens 12 coincides with that of the laser light 17 converged by that lens 12, the second embodiment is of an off-axis type where those axes do not coincide with each other and the photodiode 15 is not located under the prism 22.

For this, in the second embodiment, there is placed a prism 25 having in its central portion a through hole 25a, on the side, relative to the lens 12, of a complex optical element 11 for a bar code reader. Consequently, the laser light 17 emitted from the laser diode 21 and reflected by the reflecting film 23 goes straight ahead through the through hole 25a and becomes incident on the lens 12; the laser light 17 scattered by the bar code 24 and converged by the lens 12 is deflected by the prism 25 and becomes incident on the photodiode 15.

Figure 3:
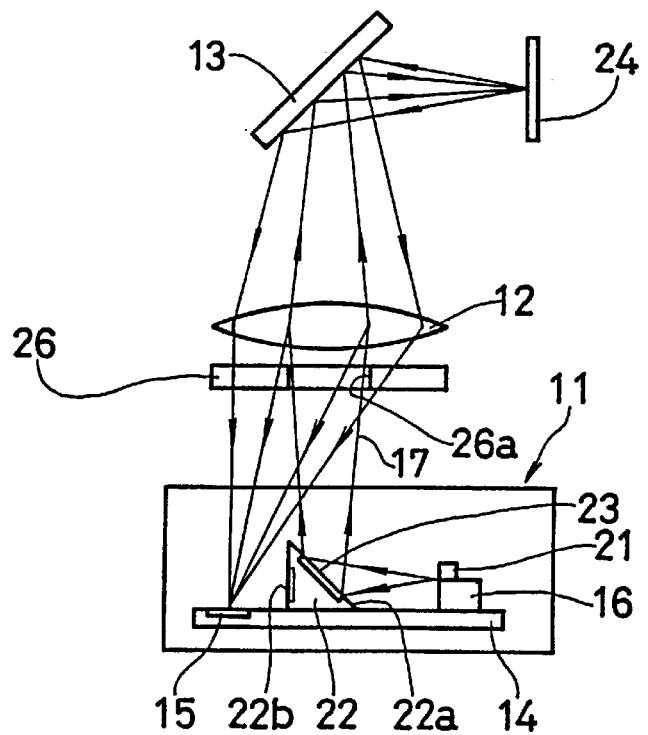
FIG. 3 shows a side view of the third embodiment according to the invention of the present application.

FIG. 3 shows the third embodiment. This third embodiment is constituted in essentially the same way as the second embodiment shown in FIG. 2 except that a hologram 26 having in its central portion a through hole 26a is used instead of the prism 25; the third embodiment executes the same function as the second embodiment does.

Figure 4:
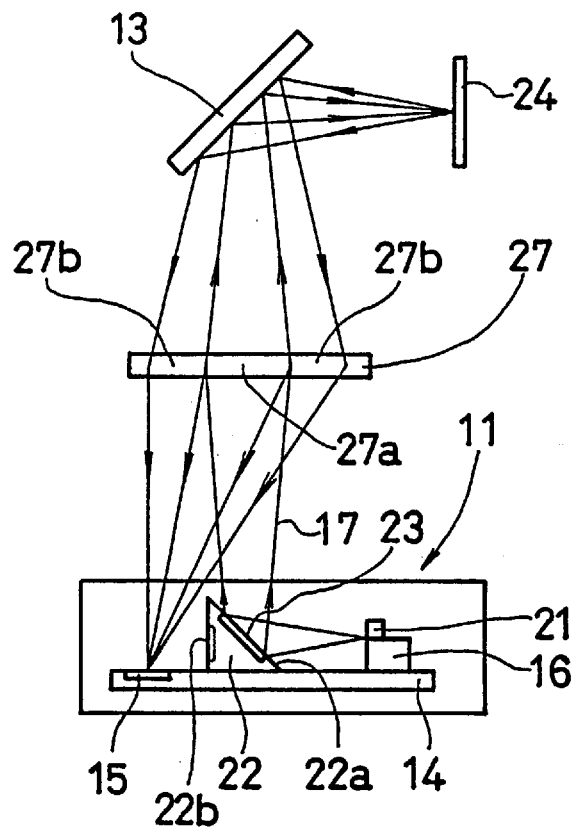
FIG. 4 shows a side view of the fourth embodiment according to the invention of the present application.

FIG. 4 shows the fourth embodiment. This fourth embodiment is constituted in essentially the same way as the third embodiment shown in FIG. 3 except that a hologram 27 executes the same function as that of the lens 12 and the hologram 26. That is, the central portion 27a of the hologram 27 executes the convergence function only while the surrounding portion 27b executes both the convergence function and the refraction function.

Figure 5:
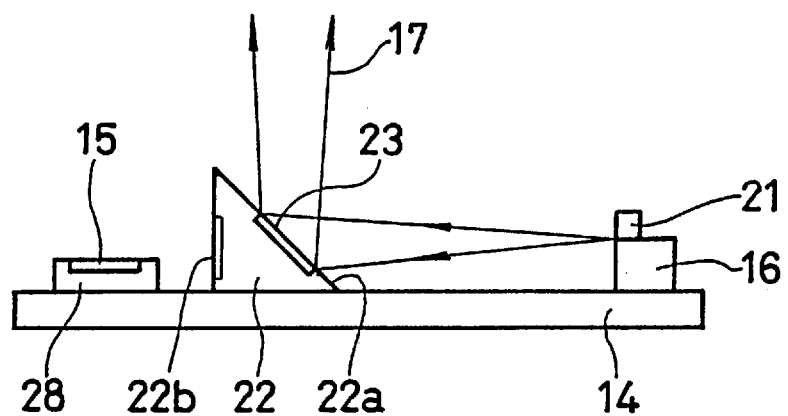
FIG. 5 shows a side view of the fifth embodiment according to the invention of the present application.
Figure 6:
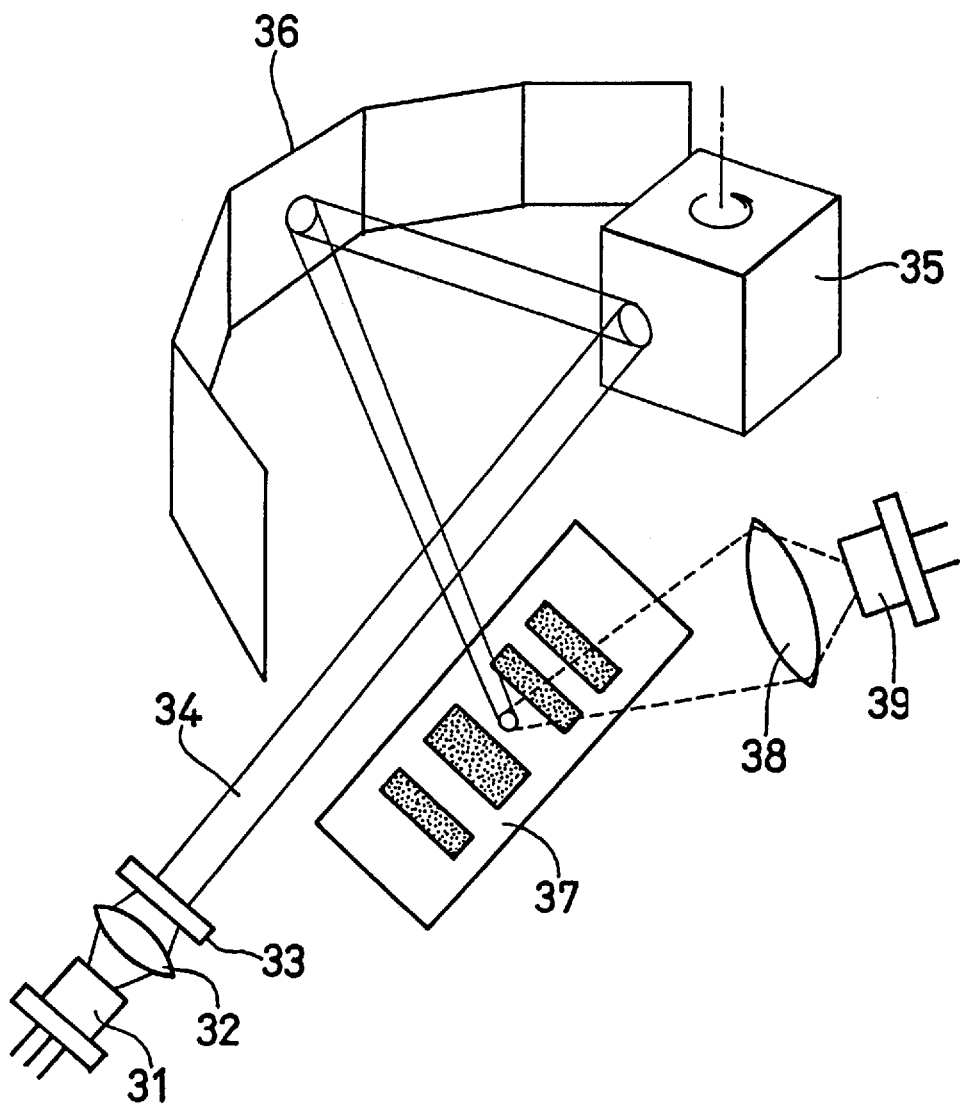
FIG. 6 shows a perspective view of a prior art according to the invention of the present application.

FIG. 5 shows the fifth embodiment. The fifth embodiment is constituted in essentially the same way as the second to fourth embodiments except that the photo diode 15 is formed in another semiconductor chip 28 than the semiconductor chip 14, and that the semiconductor chip 28 is fixed in another region than the region under the prism 22 within the semiconductor chip 14, while in the above-mentioned second to fourth embodiments, the photo diode 15 is within the semiconductor chip 14 formed in another region than the region under the prism 22.

If, in the above-mentioned second to fourth embodiments, a light-absorbing film (not shown in the figures) is provided on the vertical surface 22b of the prism 22 on the side of the photo diode 15, the laser light 17 emitted from the laser diode 21 with a wider angle than the numerical aperture of the reflecting film 23 can be prevented from incidence as stray light on the photo diode 15 as it is.

In all the above-mentioned first to fifth embodiments, the invention of the present application is applied to an optical device for a bar code reader. As a matter of course, however, the invention of the present application can also be applied to optical devices for reading a code other than bar code, such as Carla code or the like.

Industrial Applicability:

The optical device for a code reader according to the invention of the present application can be used as an optical apparatus for reading various codes such as bar code, Carla code and the like used in POS systems, physical distribution/management systems, production control systems, and so forth.

We claim:

1. An optical device for a code reader, comprising:
   a light emitting element in which is fixed relative to a semiconductor substrate and emits light for irradiating a code;
   a prism which comprises first and second surfaces and is fixed relative to said semiconductor substrate and provided with a light reflecting film on said first surface that, by reflecting said light emitted from said light emitting element, irradiates said code;
   a light absorbing film which is provided on said second surface of said prism; a light converging element which has a larger numerical aperture than that of said reflecting film and converges both said light reflected by said light reflecting film and scattered light reflected by said code;
   a light receiving element which is fixed relative to said semiconductor substrate and receives said scattered light reflected by said code and converged by said light converging element;
   wherein said prism is placed relative to said light receiving element such that said light absorbing film prevents light from traveling through said second surface to said light receiving element.

2. An optical device for a code reader according to claim 1, comprising an off-axis element which separates an axis of scattered said light reflected by said code and converged by said light converging element from an axis of said light reflected by said reflecting film and incident on said light converging element.

3. An optical device for a code reader according to claim 2, wherein said light receiving element is within said semiconductor substrate located on another region than the region where said prism is located.

4. An optical device for a code reader according to claim 2, wherein said off-axis element is either a prism or a hologram.

5. An optical device for a code reader according to claim 4, wherein said light receiving element is within said semiconductor substrate located on another region than the region where said prism is located.

6. An optical device for a code reader according to claim 4, wherein said hologram serves as said light converging element at the same time.

7. An optical device for a code reader according to claim 6, wherein said light receiving element is within said semiconductor substrate located on another region than the region where said prism is located.

8. An optical device for a code reader according to claim 1, wherein said code is a bar code.

9. An optical device for a code reader, comprising:
- a light emitting element which is fixed relative to a semiconductor substrate and emits light for irradiating a code;
- a prism which comprises a first surface and a second surface and is fixed relative to said semiconductor substrate and provided with a light reflecting film on said first surface that, by reflecting said light emitted from said light emitting element, irradiates said code;
- a light absorbing film which is provided on said second surface of said prism;
- a light converging element which has a larger numerical aperture than that of said light reflecting film and converges both said light reflected by said light reflecting film and scattered light reflected by said code;
- a light receiving element which is fixed relative to said semiconductor substrate underneath said prism and receives said scattered light reflected by said code and converged by said light converging element;
- wherein said prism is placed relative to said light receiving element such that said light absorbing film prevents light from traveling through said second surface to said light receiving element.

10. An optical device for a code reader, comprising:
- a light emitting element which is fixed relative to a semiconductor substrate and emits light for irradiating a code;
- a prism which comprises a first surface and a second surface and is fixed relative to said semiconductor substrate and provided with a light reflecting film on said first surface that, by reflecting said light emitted from said light emitting element, irradiates said code;
- a light absorbing film which is provided on said second surface of said prism;
- a light converging element which has a larger numerical aperture than that of said light reflecting film and converges both said light reflected by said light reflecting film and scattered light reflected by said code;
- a light receiving element which is fixed relative to said semiconductor substrate outside of said prism and receives said scattered light reflected by said code and converged by said light converging element;
- a prism off-axis element which separates an axis of said scattered light reflected by said code and converged by said light converging element from an axis of said light reflected by said light reflecting film and incident on said light converging element;
- wherein said prism is placed relative to said light receiving element such that said light absorbing film prevents light from traveling through said second surface to said light receiving element.

11. An optical device for a code reader, comprising:
- a light emitting element which is fixed relative to a semiconductor substrate and emits light for irradiating a code;
- a prism which comprises a first surface and a second surface and is fixed relative to said semiconductor substrate and provided with a light reflecting film on said first surface that, by reflecting said light emitted from said light emitting element, irradiates said code;
- a light absorbing film which is provided on said second surface of said prism;
- a light converging element which has a larger numerical aperture than that of said light reflecting film and converges both said light reflected by said light reflecting film and scattered light reflected by said code;
- a light receiving element which is fixed relative to said semiconductor substrate outside of said prism and receives said scattered light reflected by said code and converged by said light converging element;
- a holographic off-axis element which separates and axis of said scattered light reflected by said code and converged by said light converging element from an axis of said light reflected by said light reflecting film and incident on said light converging element;
- wherein said prism is placed relative to said light receiving element such that said light absorbing film prevents light from traveling through said second surface to said light receiving element.

* * * * *